United States Patent
Moon et al.

(10) Patent No.: US 10,158,698 B2
(45) Date of Patent: Dec. 18, 2018

(54) METHOD AND DEVICE FOR PROVIDING CONTENT IN MOBILE COMMUNICATION SYSTEM

(71) Applicant: Samsung Electronics Co., Ltd., Gyeonggi-do (KR)

(72) Inventors: Ji-Cheol Moon, Seoul (KR); Woo Jae Kim, Gyeonggi-do (KR); Ki Ho Cho, Gyeonggi-do (KR); Dong Jin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 14/433,626

(22) PCT Filed: Oct. 4, 2013

(86) PCT No.: PCT/KR2013/008886
§ 371 (c)(1),
(2) Date: Apr. 3, 2015

(87) PCT Pub. No.: WO2014/054909
PCT Pub. Date: Apr. 10, 2014

(65) Prior Publication Data
US 2015/0271250 A1    Sep. 24, 2015

(30) Foreign Application Priority Data

Oct. 4, 2012  (KR) .................... 10-2012-0110081

(51) Int. Cl.
*H04L 29/08*  (2006.01)
*H04L 29/06*  (2006.01)
*H04W 36/00*  (2009.01)

(52) U.S. Cl.
CPC .......... *H04L 67/10* (2013.01); *H04L 67/2842* (2013.01); *H04L 67/42* (2013.01); *H04W 36/0055* (2013.01)

(58) Field of Classification Search
CPC combination set(s) only.
See application file for complete search history.

(56) References Cited

U.S. PATENT DOCUMENTS

| | | | |
|---|---|---|---|
| 7,499,401 B2 | 3/2009 | Buddhikot et al. | |
| 2013/0003708 A1* | 1/2013 | Ko | H04W 4/18 370/338 |
| 2014/0115037 A1* | 4/2014 | Liu | H04L 65/1016 709/203 |

FOREIGN PATENT DOCUMENTS

KR    10-2012-0027502    3/2012

OTHER PUBLICATIONS

International Search Report dated Jan. 29, 2014 in connection with International Patent Application No. PCT/KR2013/008886, 5 pages.
(Continued)

*Primary Examiner* — Yee F Lam

(57) ABSTRACT

A method for transmitting data in a core cache server of a communication system, according to one embodiment of the present invention, comprises the steps of: receiving, from a source base station, a core cache search signal; selecting a relay core cache unit according to the received core cache search signal; and transmitting content data to a target base station through the selected relay core cache unit. A cache server for transmitting and receiving data in a communication system, according to another embodiment of the present invention, comprises: one or more core cache units for storing content data; a receiving unit for receiving, from a source base station, a core cache search signal; a control unit for selecting a relay core cache unit among the one or more core cache units according to the received core cache search
(Continued)

signal; and a transmission unit for transmitting the content data to a target base station through the selected relay core cache unit. When the present invention is used, the source base station can continuously provide content to a terminal by transmitting session information and the content to a target base station during a handover of the terminal by using a logical interface between base stations in an LTE system, and in this case, a core cache function is additionally provided such that it is possible to smoothly provide the content to a base station even when moving to a server that does not have a cache function. Thus, backhaul costs caused by a handover are reduced and a user can be provided with improved quality of experience.

13 Claims, 5 Drawing Sheets

(56) References Cited

OTHER PUBLICATIONS

Written Opinion of International Searching Authority dated Jan. 29, 2014 in connection with International Patent Application No. PCT/KR2013/008886, 5 pages.
Ardian Ulvan, et al., "Handover Scenario and Procedure in LTE-Based Femtocell Networks", UBICOMM 2010, The Fourth International Conference on Mobile Ubiquitous Computing, Systems, Services and Technologies, pp. 213-218.
S. Frei, et al., "Improvements to Inter System Handover in the EPC Environment", IEEE, 2011, 5 pages.

* cited by examiner

METHOD AND DEVICE FOR PROVIDING CONTENT IN MOBILE COMMUNICATION SYSTEM

CROSS-REFERENCE TO RELATED APPLICATION(S)

The present application claims priority under 35 U.S.C. § 365 to International Patent Application No. PCT/KR2013/008886 filed Oct. 4, 2013, entitled "METHOD AND DEVICE FOR PROVIDING CONTENT IN MOBILE COMMUNICATION SYSTEM", and, through International Patent Application No. PCT/KR2013/008886, to Korean Patent Application No. 10-2012-0110081 filed Oct. 4, 2012, each of which are incorporated herein by reference into the present disclosure as if fully set forth herein.

TECHNICAL FIELD

The present invention relates to method and device of providing contents in a mobile communication system. More particularly, the invention relates to a method and device that provides contents to mobile communication user equipment (UE), without interruption, even though the UE undergoes a handover while receiving contents from a number of eNBs.

BACKGROUND ART

In UMTS and LTE of 3GPP standard protocols, since data transmitted to/from UE is lost during the handover and, the handover process includes re-transmission of data to secure the loss, which is inefficient.

In order to improve the inefficiency, mobile communication networks such as UMTS and LTE include Mobility Management Entity (MME). The MME may be referred to as an evolved packet core (EPC).

EPC is located between entities of a mobile communication network such as UMTS and LTE. That is, EPC may be located between Radio Network Controller (RNC) and Serving GPRS Support Node (SGSN), between SGSN and GPRS Core Network (GGSN) or eNB and Serving Gateway (S-GW), between S-GW and Packet data network Gateway (P-GW). EPC shares RNC-ID or eNB-ID and information between EPCs and keeps the mapped data.

EPC may perform the following functions. A first function is to always monitor applications that UE is using by intercepting user data-plane and control-plane in IuPS and S1 interface. A second function is to monitor whether UE undergoes a handover. A third function is to identify, when detecting a handover of UE, information about an eNB that UE will move to and the related-EPCs based on mapping data, and to connect logical interface between EPCs. A fourth function is to transmit data between UE and EPC before UE moves, by using interface between EPCs.

DISCLOSURE OF INVENTION

Technical Problem

EPC is located between entities on a mobile communication network and intercepts all the data by monitoring user data-plane and control-plane. Since GTP packets are decoded and encoded, it causes data latency. Since unnecessary processes are repeated, the processing procedure is inefficient.

The present invention has been made in view of the above problems, and provides a method of providing contents in a mobile communication system, without interruption, allowing UE to undergo a handover between a number of eNBs while receiving a particular content.

Solution to Problem

In accordance with an exemplary embodiment of the present invention, the present invention provides a method of transmitting data in a core cache server of a communication system including: receiving a core cache discovery signal from a source eNB; selecting a relay core cache unit according to the received core cache discovery signal; and transmitting content data to a target eNB through the selected relay core cache unit.

In accordance with another exemplary embodiment of the present invention, the present invention provides a cache server for transmitting and receiving data in a communication system including: one or more core cache units for storing content data; a receiver for receiving a core cache discovery signal from a source eNB; a controller for selecting a relay core cache unit among the core cache units according to the received core cache discovery signal; and a transmitter for transmitting content data to a target eNB through the selected relay core cache unit.

In accordance with another exemplary embodiment of the present invention, the present invention provides a method of receiving data in user equipment (UE) in a communication system including: receiving content data from a source eNB; reporting communication status measurement of the UE to the source eNB; and receiving the content data through a target eNB that performs a handout, according to the reported communication status measurement. The content data is relayed by a core cache connecting the source eNB and the target eNB.

In accordance with another exemplary embodiment of the present invention, the present invention provides a User Equipment (UE) device including: a receiver for receiving content data from a source eNB; and a transmitter for reporting the communication status measurement of the UE device to the source eNB. The receiver receives the content data through a target eNB that performs a handout, according to the reported communication status measurement of the UE device. The content data is relayed by a core cache connecting the source eNB and the target eNB.

Advantageous Effects of Invention

As described above, according to the present invention, the source eNB can continuously provide contents to UE by transmitting session information and contents to a target eNB during a handover of the UE by using a logical interface between eNBs in an LTE system. Since the present invention further includes a core cache function, it can provide contents UE without interruption when it moves to an eNB including a server with a cache function. Therefore, the present invention can reduce backhaul costs caused by a handover and provide an enhanced quality of service to users.

BRIEF DESCRIPTION OF DRAWINGS

The features and advantages of the invention will become more apparent from the following detailed description in conjunction with the accompanying drawings, in which.

MODE FOR THE INVENTION

Hereinafter, exemplary embodiments of the present invention are described in detail with reference to the accompanying drawings.

Detailed descriptions of well-known functions and structures incorporated herein may be omitted to avoid obscuring the subject matter of the invention.

Although the drawings represent an embodiment of the invention, the drawings are not necessarily to scale and certain features may be exaggerated or omitted in order to better illustrate and explain the invention. The same reference numbers are used throughout the drawings to refer to the same or similar parts.

The following embodiments of the present invention are described based on mobile user equipment (UE) with reference to the accompanying drawings.

Figure 1:
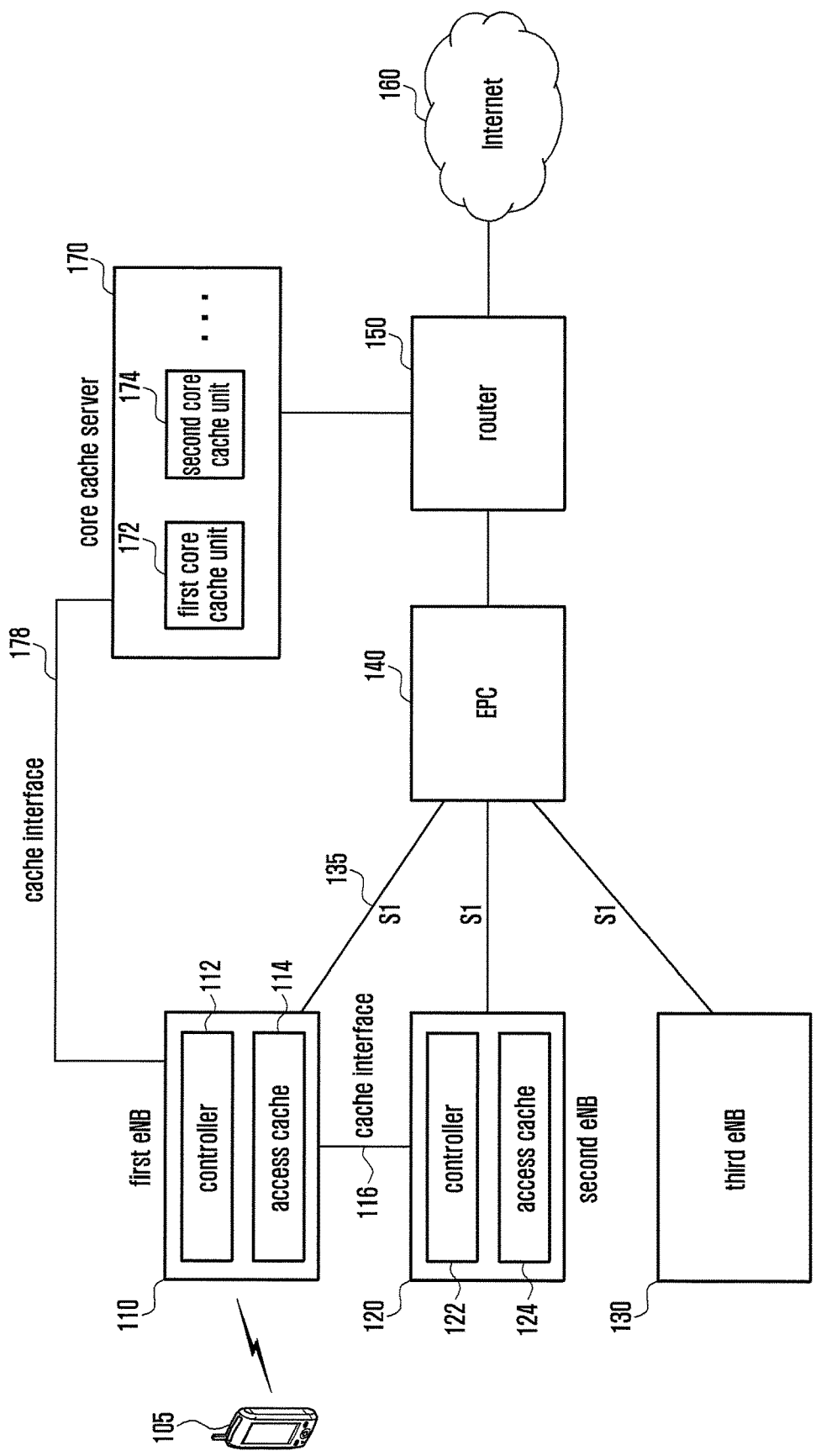
FIG. 1 is a schematic block diagram of a communication system according to an embodiment of the present invention.

FIG. 1 is a schematic block diagram of a communication system according to an embodiment of the present invention.

Referring to FIG. 1, the communication system includes a first eNB 110, a second eNB 120, and a third eNB 130, which transmit and receive information to and from user equipment (UE) 105. The eNBs receive signals from the upper entities of the communication system and transmits and receive information to and from the UE 105 based on the received signals.

The first eNB 110 and second eNB 120 include controllers 112 and 122 for controlling the operations and access caches 114 and 124 for storing data to be transmitted to UE 105, correspondingly and respectively.

The controllers 112 and 122 control the operations of the respective eNBs. The controllers 112 and 122 transmit/receive information to/from UE 105 and EPC 140.

The access caches 114 and 124 store contents transmitted from EPC 140, etc. to provide them to UE 105. The contents include one or more of the following: videos, music, photographs, and web pages. The contents also include data requested by a user. In an embodiment, the access caches 114 and 124 store contents with a high frequency of use. The respective eNBs store contents that users have frequently accessed in the access caches 114 and 124 and transmit data to UE according to a user's request, thereby reducing transmission/reception load to/from the upper entity, i.e., the number of transmission/reception of data to/from the upper entity.

The first eNB 110 and second eNB 120 are connected to each other through a cache interface 116, thereby sharing the contents of the access caches 114 and 124. Since the first eNB 110 and second eNB 120 are connected to each other through the cache interface 116, they can easily perform transmission of contents data while UE 105 undergoes a handover between the eNBs.

The upper entity includes EPC 140. EPC 140 may is referred to as Mobile Management Entity (MME) and performs mobility management of UE. EPC 140 is connected to the respective eNBs through S1 interfaces 135.

EPC 140 is connected to an Internet 160 through a router 150. In an embodiment, the router 150 may serve as a switch. The router 150 performs a load distributing function during the communication. The router 150 may distribute load by a switching function.

The Internet 160 includes an original server with contents requested by UE 105. When UE 105 requests content from the communication system, the communication system transmits it from the original server to the UE 105 through the Internet 160.

The communication system includes a core cache server 170. The core cache server 170 includes a number of core cache units 172 and 174. The core cache units store contents from UE. The core cache units establish sessions with UE and transmit/receive data to/from them. Since the core cache server 170 includes a number of core cache units 172 and 174, they can perform load distribution and server performance management. The core cache units 172 and 174 independently transmit/receive data to/from the eNBs. The core cache server 170 also include a transmitter for transmitting data to other components in the communication system, a receiver for receiving data from other components in the communication system, and a controller for controlling the operations of the core cache server 170 based on the transmitted/received data.

The core cache server 170 is connected to the eNBs 110 and 120 through a cache interface 178. In an embodiment, the cache interface 178 may be implemented with a wired backhaul. Since the core cache server 170 connects the core cache server 170 and the eNBs 110 and 120, transmission/reception of data can be smoothly performed.

Figure 2:
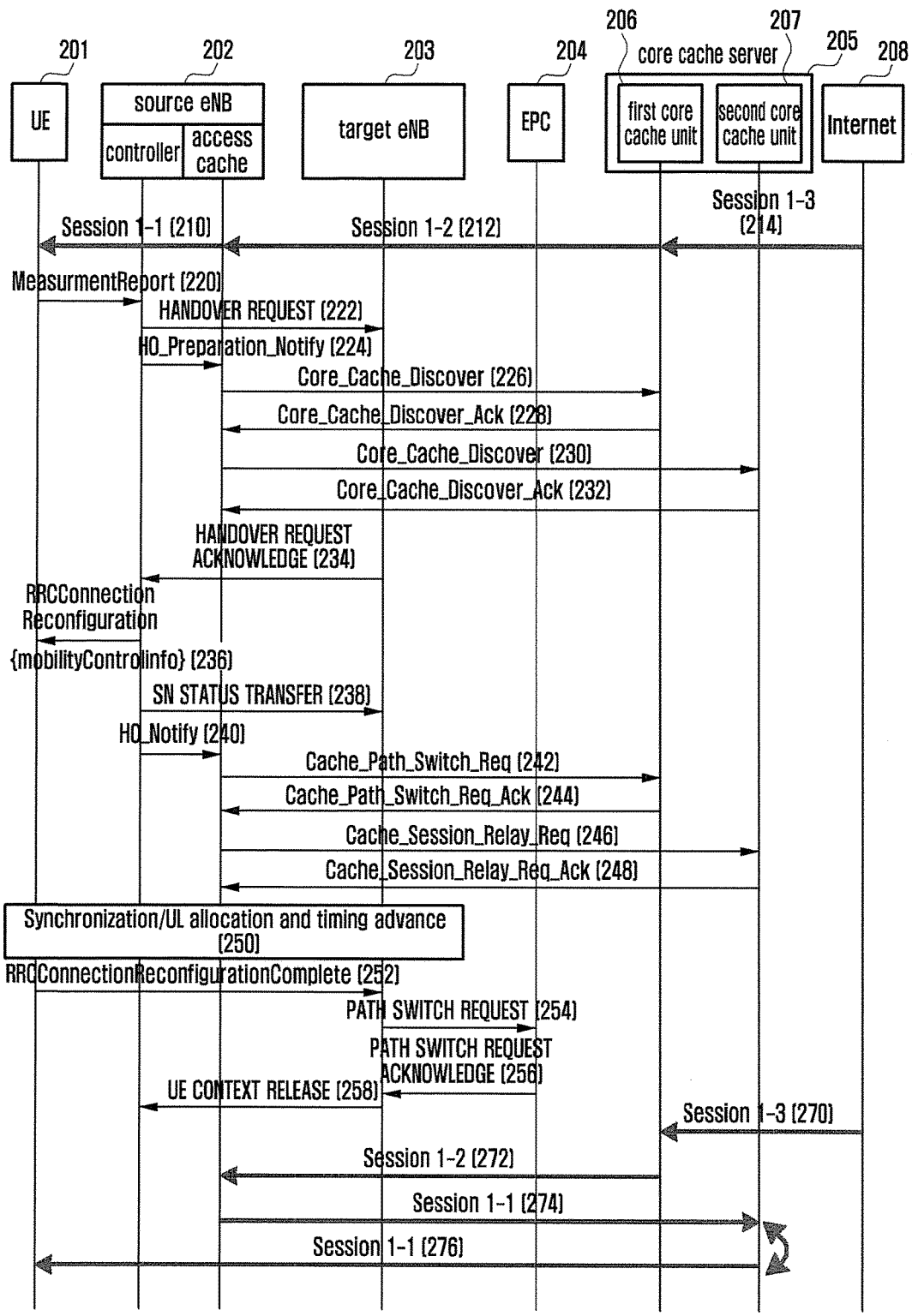
FIG. 2 is a signal flow chart that describes a handover process according to an embodiment of the present invention.

FIG. 2 is a signal flow chart that describes a handover process according to an embodiment of the present invention.

Referring to FIG. 2, Session 1-1 is established between user equipment (UE) 201 and a source eNB 202 (210). Session 1-2 is established between the source eNB 202 and a core cache server 205 (212). Session 1-3 is established between the core cache server 205 and the Internet 208 (212). The embodiment is described based on the sessions that are all established connecting the entities; however, it should be understood that not all of them may be established for the connection.

When a handover occurs while the source eNB 202 transmits contents from the access cache to UE 201 during the Session 1-1 in operation 210, the process is described. In an embodiment, when the contents have not been stored in the access cache (Access Cache MISS), the access cache may download the contents during the Session 1-2 in operation 212. During the Session 1-2 in operation 212, transmission/reception is performed through the S1 interface.

In another embodiment, when the contents have not been stored in the core cache server 205 (Core Cache MISS), the core cache server 205 may download the contents from the Internet 208 during the Session 1-3 in operation 214.

UE 201 undergoes a handover from the source eNB 202 to a target eNB 203. The eNBs 202 and 203 and the core cache server 205 may transmit/receive data to/from each other so that UE 201 has received contents from the source eNB 202 before the handover and smoothly transmits them during the handover. Although the embodiment is described in such a way that the target eNB 203 includes an access cache, the target eNB 203 may be configured without the access cache to perform the handover.

UE 201 transmits a message, Messurement Report, to the source eNB 202 according to rules, such as system information, standards, etc., (220). The MessurementReport includes communication channel status and signal transmission/reception strength information. The source eNB 202 determines whether to perform a handover for the UE based on the received MessurementReport and radio resource management information. When the source eNB 202 determine to perform a handover for the UE, it performs corresponding processes as follows.

The source eNB 202 transmits a message, HANDOVER REQUEST, including information required for handover, to the target eNB 203 (222). The target eNB 203 performs management control based on E-RAB and/or QoS included in the received HANDOVER REQUEST.

In the source eNB 202, the controller transmits HO_Preparation_Notify including information for preparing the handover for the UE 201 to the access cache (224).

In an embodiment, operations 222 and 224 may be flexibly performed in order.

When the source eNB 202 has established Session 1-2 in operation 212, it transmits a signal, Core_Cache_Discover, for discovering a core cache unit as a peer for Session 1-2 to the core cache server 205 (226).

When the core cache server 205 includes a number of core cache units 206 and 207, network equipment (e.g., router, L4 switch, etc.) between EPC 204 and the Internet 208 may allocate core cache units to sessions by using its load distribution algorithm. Therefore, it is difficult to preset a process of discovering a core cache unit corresponding to the session.

The Core-Cache_Discover includes a TCP/IP header that the access cache of the source eNB 202 uses to transmit packets during the Session 1-2 (in operation 212). The TCP/IP header of the Core-Cache_Discover is the same as that of a packet when transmission/reception is performed during the Session 1-2. Therefore, network equipment may make an allocation to a core cache unit corresponding to the Session 1-2 (in operation 212) (e.g., a first core cache 206 in the embodiment).

In an embodiment, an identifier for representing a Core-Cache_Discover packet maybe included in TCP option header or a reserved field of the TCP header the Core-Cache Discover. When the core cache unit receives the Core-Cache_Discover by using the identifier, it transmits the Ack to notify that it has normally received the Core_Cache_Discover. In an embodiment, an ID of the access cache (e.g., IP address) may be shown in the TCP payload of the Core-Cache_Discovery packet. In an embodiment, the Core-Cache_Discover packet may be transmitted to a first core cache unit, through the S1 interface and EPC, according to a load distribution algorithm of network equipment between the EPC and the Internet.

The first core cache unit 206 transmits a Core-Cache_Discovery_Ack packet to the source eNB 202 to notify that it has received the Core_Cache_Discover packet (228). In an embodiment, the Core-Cache_Discovery_Ack packet may be created by swapping the IP source address with the IP destination address of the received Core-Cache_Discovery packet and by swapping the TCP source port with the TCP destination port. The Core-Cache_Discover_Ack packet can be indicated by the reserved field of the TCP header or the TCP option header.

In an embodiment, the first core cache unit 206 may indicate the ID of the Core Cache (e.g., IP address) in the TCP payload of the Core-Cache_Discover_Ack packet. In an embodiment, the Core-Cache_Discover_Ack packet may be transmitted to an access cache of the source eNB 202 through EPC and S1 interface.

The source eNB transmits the Core-Cache_Discovery packet to discover a core cache unit to relay Session 1-1 (230).

The Core-Cache_Discover packet may be created by using the TCP/IP header of Session 1-1 in the same way as operation 226. The Core-Cache_Discovery packet may be transmitted to a second cache unit 207 through S1 interface and EPC, according to a load distribution algorithm of network equipment between the EPC and the Internet.

For the sake of convenient description, the embodiment is described in such a way that the Core-Cache_Discover packet is transmitted to an additional core cache unit; however, it may be modified in such a way that the first core cache unit 206 and the second core cache unit 207 are identical to each other as a core cache unit. Therefore, the load distribution algorithm of network equipment may determine a core cache unit to which a packet is transmitted in operation 226 and a core cache unit to which a packet is transmitted in operation 230. Accordingly, the same core cache unit may be selected or different core cache units may be selected.

In response to the Core-Cache_Discover received in operation 230, the second core cache unit 207 transmits the Core-Cache_Discovery_Ack to the source eNB 202 (232).

The Core-Cache_Discovery_Ack packet may be created in the same method as operation 228. Therefore, the Core-Cache_Discover_Ack packet is transmitted to the source eNB 202 through EPC and S1 interface.

The target eNB 203 transmits HANDOVER REQUEST ACKNOWLEDGE to the source eNB 202 in response to the HANDOVER REQUEST (234). The HANDOVER REQUEST ACKNOWLEDGE may include a message, RRCConnectionReconfiguration message including mobile-ControlInfo IE.

The source eNB 202 transmits RRCConnectionReconfiguration including information required for handover to UE 201 (236). UE 201 receives RRCConnectionReconfiguration and prepares for a handover to the target eNB 203.

The source eNB 202 transmits SN STATUS TRANSFER to the target eNB 203 (238). In the embodiment, the SN STATUS TRANSFER includes statuses of an uplink PDCP SN receiver and downlink PDCP transmitter of E-RABs where a PDCP status need to be retained during the communication with UE 201.

In the source eNB 202, the controller transmits HO_Notify to the access cache (240). The access cache receives the HO_Notify and prepares for a handover to transmit contents to UE 201.

The access cache of the source eNB 202 transmits a message, Cache_Path_Switch_Req, to the first core cache unit 206 (242). The first core cache unit 206 receives the Cache_Path_Switch_Req message and alters the path of contents transmitted/received during the Session 1-2.

In another embodiment, the access cache of the source eNB 202 designates the first core cache unit 206 by using the Core Cache ID obtained in operation 226 and transmits the Cache_Path_Switch_Req messaged to the first core cache unit 206 of the core cache server 205 through a cache interface.

The first core cache unit 206 transmits the Cache_Path_Switch_Req_Ack message to the access cache of the source eNB 202, in response to the received Cache_Path_Switch_Req message (244).

In another embodiment, after that, transmission of contents according to Session 1-2 may be performed between the first core cache unit 206 and the access cache of the source eNB 202 by using the cache interface.

The access cache of the source eNB 202 transmits a message, Cache_Session_Relay_Req, to the second core cache unit 207 (246). The Cache_Session_Relay_Req message may include information requesting the second core cache unit 207 to relay Session 1-2.

In another embodiment, the access cache of the source eNB 202 designates the second core cache unit 207 by using the Core Cache ID obtained in operation 230 and transmits the Cache_Session_Relay_Req message to the second core cache unit 207 through the cache interface.

The second core cache unit 207 transmits the Cache_Session_Relay_Ack message to the access cache, in response to the received Cache_Session_Relay_Req message (248). After that, the second core cache unit 207 relays Session 1-2.

UE 201 receives the RRCConnectionReconfiguration message including mobileControlInfo IE, synchronizes with the target eNB 203, and is connected to a target cell that the target eNB 203 manages through Random Access Channel (RACH) (250). In another embodiment, the target eNB makes a response with UL allocation and timing advance.

UE 201 transmits a RRCConnection-Reconfiguration-Complete message including information that UE 201 has successfully connected to a target cell to the target eNB 203 (252).

The target eNB 203 transmits a PATH SWITCH REQUEST message including information that a cell to which UE 201 is connected has been switched to the EPC 204 (254).

The EPC 204 transmits a PATH SWITCH REQUEST ACKNOWLDGE message to the target eNB 203, informing that the PATH SWITCH REQUEST has been successfully received in operation 254 (256).

The target eNB 203 transmits a UE CONTEXT RELEASE message including information about a successful handover to the source eNB 202 (258). The source eNB 202 has received the UE CONTEXT RELEASE message and releases resources that has been used for communication with UE 201. When the source eNB 202 receives the UE CONTEXT RELEASE message, it releases UE context-related radio and control plane-related resources.

When the handover has been made, transmission/reception of content data is performed operations 270 to 276 as follows.

Operation 270 refers to a process performed when Core Cache MISS occurred. The core cache server 205 receives content data from the Internet 208 during the Session 1-3.

Operation 273 refers to a process performed when Access Cache MISS occurred. The source eNB 202 receives content data from the core cache server 205 during the Session 1-2. The reception of content data is performed through a cache interface between the core cache server 205 and the source eNB 202.

Operations 274 and 276 refer to processes of relaying data through the core cache server 205. The core cache server 205 receives data from the access cache of the source eNB 202 during the Session 1-1 in operation 274. The core cache server 205 relays the received data to the UE 201 during the Session 1-1, thereby performing the handover in operation 276. Data transmission in 274 maybe performed through the cache interface between the source eNB 202 and the core cache server 205. Data transmission in operation 276 may be performed through S1 interface.

When the access cache of the source eNB 202 has already stored content data, operations 226, 228, 242 and 244 may not be performed.

Figure 3:
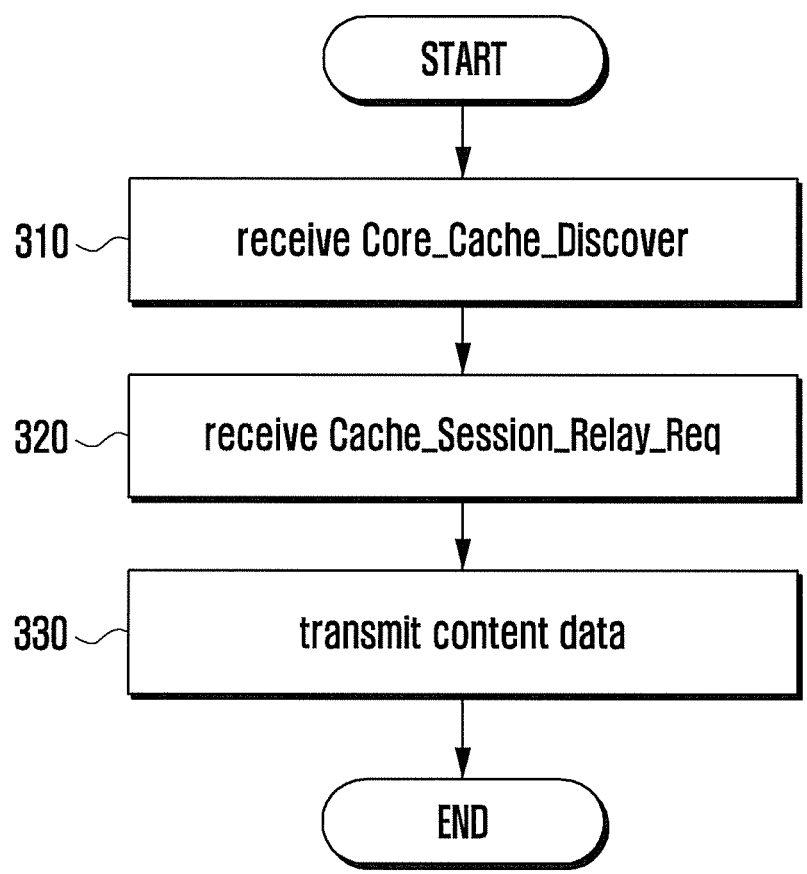
FIG. 3 is a flow chart that describes process in a core cache server according to an embodiment of the present invention.

FIG. 3 is a flow chart that describes process in a core cache server according to an embodiment of the present invention.

Referring to FIG. 3, a core cache server receives Core_Cache_Discover from a source eNB (310). The Core_Cache_Discover includes information for discovering a core cache unit related to a session established between the source eNB and UE. The core cache server receives the Core_Cache_Discover through S1 interface. According to the information included in the Core_Cache_Discover, one of the core cache units included in the core cache server transmits a message to the source eNB in response to the Core_Cache_Discover.

When the core cache server has successfully received the Core_Cache_Discover, it transmits the Core_Cache_Discover_Ack to the source eNB.

The core cache server receives Cache_Session_Relay_Req from the source eNB (320). The Cache_Session_Relay_Req is transmitted to a corresponding core cache unit. The Cache_Session_Relay_Req is a request for relaying data stored in the access cache of the source eNB.

When the core cache server has successfully received the Cache_Session_Relay_Req, it transmits a Cache_Session_Relay_Req_Ack to the source eNB.

The core cache server receives content data from the access cache of the source eNB and relays it to UE (330).

The core cache unit of the core cache server that has received the Core_Cache_Discover from the in operation 310 receives content data from the access cache of the source eNB through a cache interface and relays it to the UE through an S1 interface.

Figure 4:
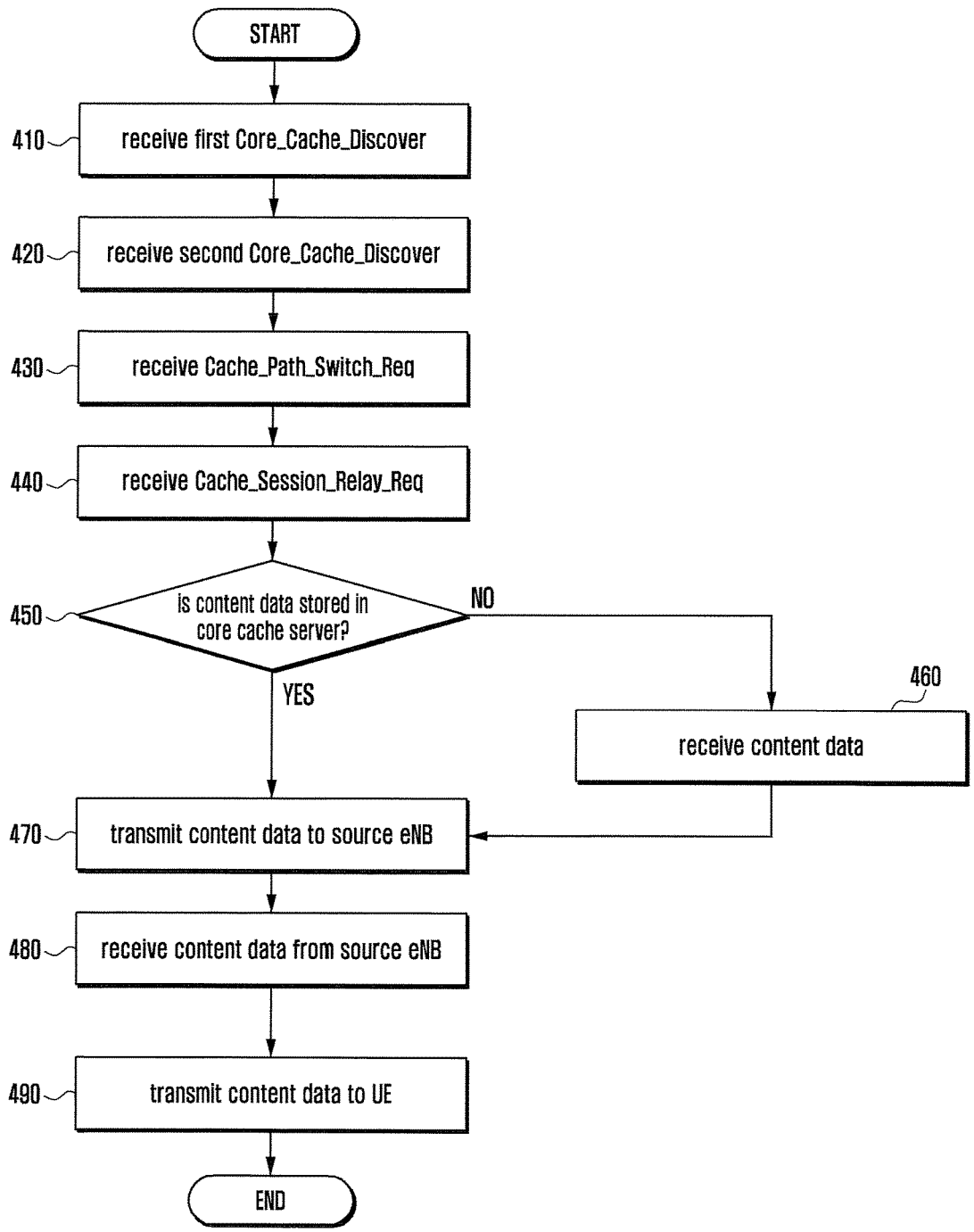
FIG. 4 is a flow chart that describes process in a core cache server according to another embodiment of the present invention.

FIG. 4 is a flow chart that describes process in a core cache server according to another embodiment of the present invention.

Referring to FIG. 4, a core cache server receives a first Core_Cache_Discover from a source eNB (410). When the source eNB has not stored content data about the core cache server, it transmits the first Core_Cache_Discover to the core cache server to determine whether the content data is stored in the core cache server. When the core cache server has successfully received the first Core_Cache_Discover, it transmits a first Core_Cache_Discover_Ack to the source eNB.

The core cache server receives a second Core_Cache_Discover from the source eNB (420). The access cache of the source eNB transmits the second Core_Cache_Discover to the core cache server to discover a core cache unit that relays content data through a session established between the source eNB and the UE. The core cache server receives the second Core_Cache_Discover through an S1 interface. The second Core_Cache_Discover is received by a core cache unit that is selected from the core cache server by a load management algorithm such as a network switch, etc. When the core cache server has successfully received the second Core_Cache_Discover, it transmits a second Core_Cache_Discover_Ack to the source eNB.

The core cache server receives Cache_Path_Switch_Req from the source eNB (430). After receiving the Cache_Path_

Switch_Req, the core cache server switches the path of contents transmitted through a session established between the source eNB and the core cache server to comply with a handover.

The core cache server receives Cache_Session_Relay_Req from the source eNB (440). After receiving the Cache_Session_Relay_Req, the core cache server relays content data transmitted through the session established between the source eNB and the UE.

The embodiment may be modified in such a way that operations 410 to 440 are performed in different order. For example, in a modification, the core cache server may receive the messages in order of the following: the second Core_Cache_Discover, the first Core_Cache_Discover, the Cache_Session_Relay_Req and the Cache_Path_Switch_Req.

The core cache server determines whether content data transmitted between the UE and the source eNB is stored in its core cache unit (450).

When content data is stored in the core cache unit of the core cache server determines whether in operation 450, the core cache server establishes a session with the Internet and downloads the contents through the Internet (460).

The core cache server transmits content data, stored in its core cache unit, to the source eNB (470). The content data is downloaded through the Internet or is contents stored in the core cache unit.

The core cache server receives content data required for handover from the source eNB (480), and relays the received data to the UE (490).

Figure 5:
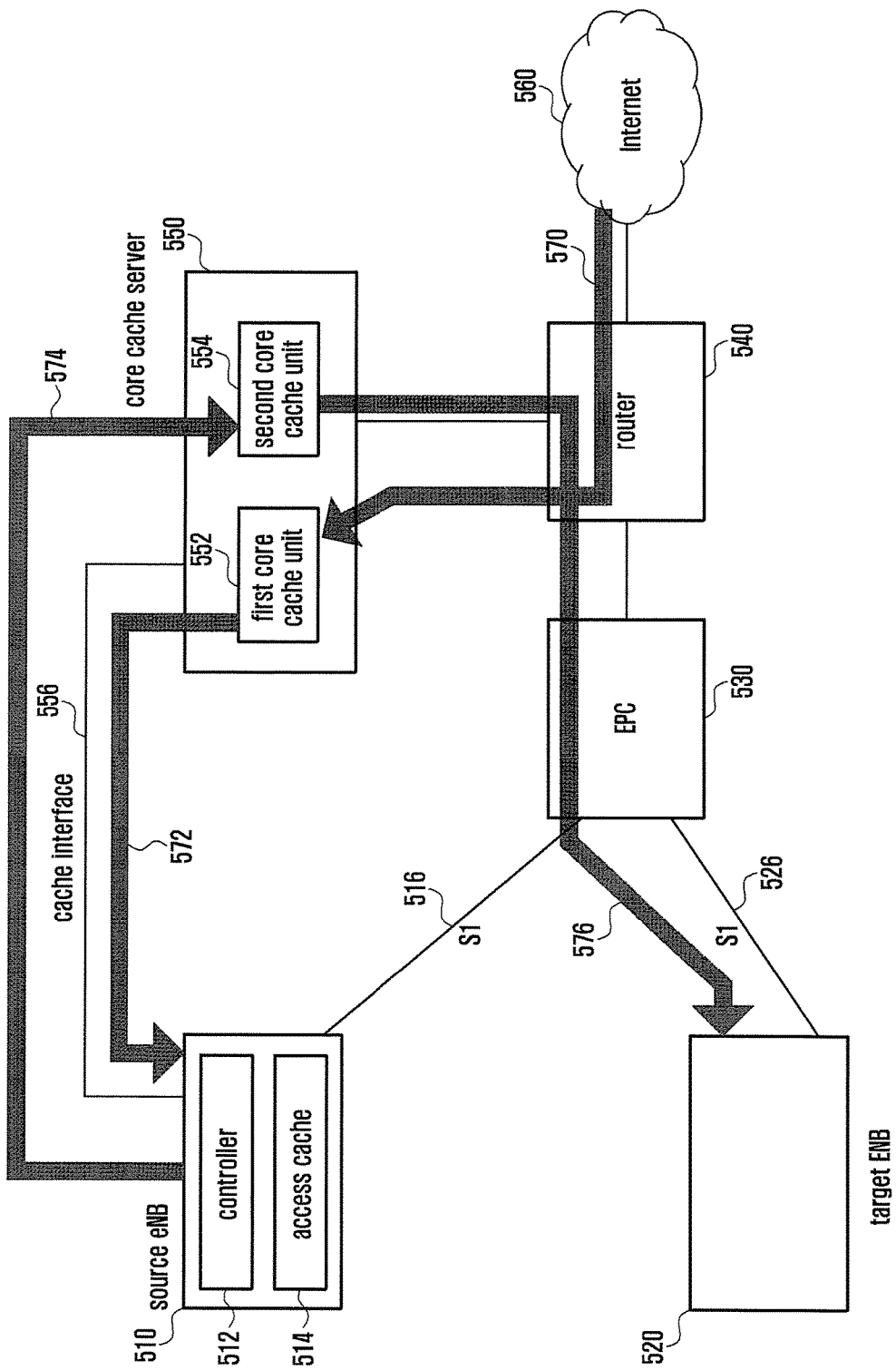
FIG. 5 is a diagram that describes a flow of contents in a communication system according to an embodiment of the present invention.

FIG. 5 is a diagram that describes a flow of contents in a communication system according to an embodiment of the present invention.

Referring to FIG. 5, UE (not shown) undergoes a handover from a source eNB 510 to a target eNB 520 in a communication system.

The source eNB 510 includes a controller 512 for performing transmission/reception of signals and controlling the entire operation of source eNB 510 and an access cache 514 for storing content data to be transmitted UE, satisfying a preset condition.

The target eNB 520 may be configured with the same components as the source eNB 510. In an embodiment, the target eNB 520 may be implemented in such a way that it includes a controller for performing transmission/reception of signals and controlling the entire operation of the target eNB 520 and may include an access cache as an option component.

The source eNB 510 and target eNB 520 are connected to EPC 530 through S1 interfaces 516 and 526. EPC 530 is connected to the Internet 560 through a router 540 for performing a switching function and/or a load balancing function.

The router 540 is connected to a core cache server 550. The core cache server 550 stores content data transmitted to/received from UE, satisfying a preset condition. The core cache server 550 includes a number of core cache units to perform a load balancing, etc. The embodiment is described in such a way that the core cache server 550 includes a first core cache unit 552 and a second core cache unit 554, which may be the same type of core cache unit.

The core cache server 550 is connected to the source eNB 510 through a cache interface 556. Therefore, the data stored in the core cache server 550 and the data the access cache 514 can be easily transmitted between the core cache server 550 and the source eNB 510.

The following embodiments describe transmission/reception of content data. When UE undergoes a handover from the source eNB 510 to the target eNB 520, the flow of content data is explained as follows.

Embodiment 1 is a case where content data has been stored in the access cache 514. The source eNB 510 transmits Core_Cache_Discovery to the core cache server 550 through the S1 interface 516. The router 540 transmits the Core_Cache_Discovery to the second core cache unit 554 by using a load distribution algorithm. This may be different according to the load distribution algorithm. Therefore, the source eNB 510 transmits (574) content data to the second core cache unit 554 through the cache interface 556, and the second core cache unit 554 transmits the received content data to the target eNB 520 through the S1 interface 526.

Embodiment 2 is a case where content data has been stored not in the access cache 514 but in the core cache server 550 (Access Cache MISS). The source eNB 510 transmits the Core_Cache_Discovery message through the S1 interface 516. The Core_Cache_Discovery is transmitted to the first core cache unit 552 by a distribution algorithm of the router 540. The first core cache unit 552 transmits (572) the stored content data to the source eNB 510 through the cache interface 556. The source eNB 510 transmits (574) the received data to the core cache server 550. The core cache server 550 transmits (576) the received data to the target eNB 520 through the S1 interface.

Embodiment 3 is the same case as Embodiment 2; however, it differs from Embodiment 2 in that the core cache server 550 transmits content data to the target eNB 520, not through the source eNB 510.

Embodiment 4 is a case where content data has not been stored in the access cache 514 and the core cache server 550 (Core Cache MISS). The core cache server 550 receives (570) content data from the Internet 560. After that, the source eNB 510 transmits a Core_Cache_Discovery message through the S1 interface 516. The Core_Cache_Discovery is transmitted to the first core cache unit 552 by a distribution algorithm of the router 540. The first core cache unit 552 transmits (572) the stored content data to the source eNB 510 through the cache interface 556. The source eNB 510 transmits (574) the received data to the core cache server 550, and the core cache server 550 relays (576) the received data to the target eNB 520 through the S1 interface.

Embodiment 5 is the same case as Embodiment 4; however, it differs from Embodiment 4 in that the core cache server 550 transmits content data to the target eNB 520, not through the source eNB 510.

It will be easily appreciated to those skilled in the art that many variations and modifications of the basic inventive concept herein described will still fall within the spirit and scope of the exemplary embodiments of the invention. One skilled in the art will understand that the embodiments disclosed in the description and configurations illustrated in the drawings are only preferred embodiments, instead there may be various modifications, alterations, and equivalents thereof to replace the embodiments at the time of filing this application.

Exemplary embodiments of the invention have been described in the description and drawings. The terminology used in the detailed description of the particular exemplary embodiments illustrated in the accompanying drawings is not intended to be limiting of the invention. It should be understood that many variations and modifications of the basic inventive concept herein described, which may be apparent to those skilled in the art, will still fall within the spirit and scope of the exemplary embodiments of the invention as defined in the appended claims.

The invention claimed is:

1. A method to transmit data by a core cache server in a communication system, the method comprising:
   receiving, at the core cache server including one or more core cache units, a core cache discovery signal, including information for content data for a terminal, from a source base station;
   receiving, at the core cache server, a relay request including session information corresponding to the terminal and the source base station;
   selecting, from the one or more core cache units of the core cache server, a core cache unit as a relay core cache unit based on the received core cache discovery signal and load information of a network related to the core cache server,
   identifying whether the content data is acquired at the selected relay core cache unit based on the information for the content data for the terminal;
   receiving the content data for the terminal if the content data for the terminal is not acquired at the selected relay core cache unit; and
   transmitting the content data to a target base station via the selected relay core cache unit based on the session information,
   wherein the selected relay core cache unit is identified based in consideration of a data transmission from the core cache server to the source base station.

2. The method of claim 1, further comprising:
   receiving the content data from the source base station, wherein transmitting the content data to the target base station comprises transmitting the content data from the source base station via the relay core cache unit to the target base station.

3. The method of claim 2, wherein the content data is received via a cache interface connecting the source base station and the core cache server.

4. The method of claim 1, further comprising:
   transmitting a message to acknowledge that the content data has been successfully transmitted in response to receiving the core cache discovery signal.

5. The method of claim 1, wherein receiving the core cache discovery signal comprises:
   receiving a first core cache discovery signal to discover a core cache unit of the one or more core cache units of the core cache server to be a relay core cache unit for content data of a session established between the source base station and the terminal, and
   receiving a second core cache discovery signal to discover a core cache unit of the one or more core cache units of the core cache server to be a peer of a session established between the source base station and the core cache server;
   wherein the selection of the relay core cache unit comprises selecting the relay core cache unit based on the first core cache discovery signal; and
   wherein the method further comprises transmitting the content data from the core cache unit, selected by the second core cache discovery signal, from the source base station.

6. The method of claim 1, wherein receiving the core cache discovery signal comprises:
   receiving a first core cache discovery signal to discover a core cache unit of the one or more core cache units of the core cache server to be a relay core cache unit for data of a session established between the source base station and the terminal, and receiving a second core cache discovery signal to discover a core cache unit of the one or more core cache units of the core cache server to be a peer of a session established between the source base station and the core cache server;
   wherein the selection of the relay core cache unit comprises selecting the relay core cache unit based on the first core cache discovery signal; and
   wherein the content data is transmitted to the source base station via a core cache unit selected by the second core cache discovery signal.

7. The method of claim 1, wherein the content data is received from an internet.

8. A core cache server to transmit and receive content data in a communication system, the core cache server comprising:
   one or more core cache units;
   a transceiver;
   a controller coupled with the transceiver and configured to:
   receive a core cache discovery signal including information for content data for a terminal from a source base station;
   receive a relay request including session information corresponding to the terminal and the source base station;
   select, from the one or more core cache units of the core cache server, a core cache unit as a relay core cache unit based on the received core cache discovery signal and load information of a network related to the core cache server,
   identify whether the content data is acquired at the selected relay core cache unit based on the information for the content data for the terminal;
   receive the content data for the terminal if the content data for the terminal is not acquired at the selected relay core cache unit based on the session information; and
   transmit the content data to a target base station via the selected relay core cache unit,
   wherein the selected relay core cache unit is identified in consideration of a data transmission from the core cache server to the source base station.

9. The core cache server of claim 8, wherein the controller is further configured to receive the content data from the source base station, and the transceiver is configured to transmit the content data transmitted from the source base station to the target base station via the relay core cache unit.

10. The core cache server of claim 8, wherein the controller is further configured to transmit a message to acknowledge that the content data has been successfully transmitted in response to receiving the core cache discovery signal.

11. The core cache server of claim 8, wherein the core cache discovery signal comprises:
    a first core cache discovery signal to discover a core cache unit of the one or more core cache units of the core cache server to be a relay core cache unit for content data of a session established between the source base station and the terminal, and
    a second core cache discovery signal to discover a core cache unit of the one or more core cache units of the core cache server to be a peer of a session established between the source base station and the core cache server;
    wherein the controller is configured to select the relay core cache unit based on the first core cache discovery signal; and wherein the content data is transmitted to the source base station via the core cache unit selected by the second core cache discovery signal.

12. The core cache server of claim 8, wherein the core cache discovery signal comprises:
   a first core cache discovery signal to discover a core cache unit of the one or more core cache units of the core cache server to be a relay core cache unit for data of a session established between the source base station and the terminal, and
   a second core cache discovery signal to discover a core cache unit of the one or more core cache units of the core cache server to be a peer of a session established between the source base station and the core cache server,
   wherein the controller is configured to select the relay core cache unit based on the first core cache discovery signal; and
   wherein the content data is transmitted to the terminal via the core cache unit selected by the second core cache discovery signal.

13. The core cache server of claim 8, wherein the controller is further configured to receive the content data from an internet; and wherein the transceiver is configured to transmit the received content data to the target base station.

* * * * *